United States Patent
Stefan et al.

(10) Patent No.: US 10,053,055 B2
(45) Date of Patent: Aug. 21, 2018

(54) METHOD FOR PREVENTING THEFTS OF MOTOR VEHICLES

(71) Applicant: Ford Global Technologies, LLC, Dearborn, MI (US)

(72) Inventors: Frederic Stefan, Aachen NRW (DE); Uwe Gussen, Huertgenwald NRW (DE); Christoph Arndt, Moerlen Rheinland-Pfalz (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/611,311

(22) Filed: Jun. 1, 2017

(65) Prior Publication Data

US 2017/0349141 A1    Dec. 7, 2017

(30) Foreign Application Priority Data

Jun. 2, 2016 (DE) .................. 10 2016 209 679

(51) Int. Cl.
*B60Q 1/00* (2006.01)
*G09F 9/00* (2006.01)
*B60R 25/102* (2013.01)
*B60R 25/10* (2013.01)

(52) U.S. Cl.
CPC ........ *B60R 25/102* (2013.01); *B60R 25/1012* (2013.01)

(58) Field of Classification Search
CPC combination set(s) only.
See application file for complete search history.

(56) References Cited

U.S. PATENT DOCUMENTS

| | | | |
|---|---|---|---|
| 5,311,186 A | 5/1994 | Utsu et al. | |
| 7,498,954 B2 | 3/2009 | Boss et al. | |
| 8,736,433 B2 | 5/2014 | Balakrishnan et al. | |
| 2002/0128769 A1* | 9/2002 | Der Ghazarian | G07B 15/04 701/408 |
| 2010/0272027 A1* | 10/2010 | Sendrowicz | G08B 21/028 370/328 |
| 2011/0037620 A1 | 2/2011 | Paun | |
| 2011/0316682 A1 | 12/2011 | Pan | |
| 2013/0300581 A1* | 11/2013 | Jenkins | G08G 1/166 340/903 |
| 2015/0022663 A1 | 1/2015 | Wang et al. | |
| 2016/0019788 A1* | 1/2016 | Milne | G08G 1/133 340/988 |
| 2018/0001869 A1* | 1/2018 | Ur | B60R 25/102 |

\* cited by examiner

*Primary Examiner* — Travis Hunnings
(74) *Attorney, Agent, or Firm* — Frank A. MacKenzie; Brooks Kushman P.C.

(57) ABSTRACT

The disclosure relates to a method for preventing thefts of motor vehicles. The method includes detecting motor vehicles within a predetermined neighborhood of a motor vehicle to be monitored. The method further includes sending a query data record from the motor vehicle to be monitored to the detected motor vehicles. The method also includes monitoring of the motor vehicle to be monitored by the detected motor vehicles on reception of the query data record.

8 Claims, 1 Drawing Sheet

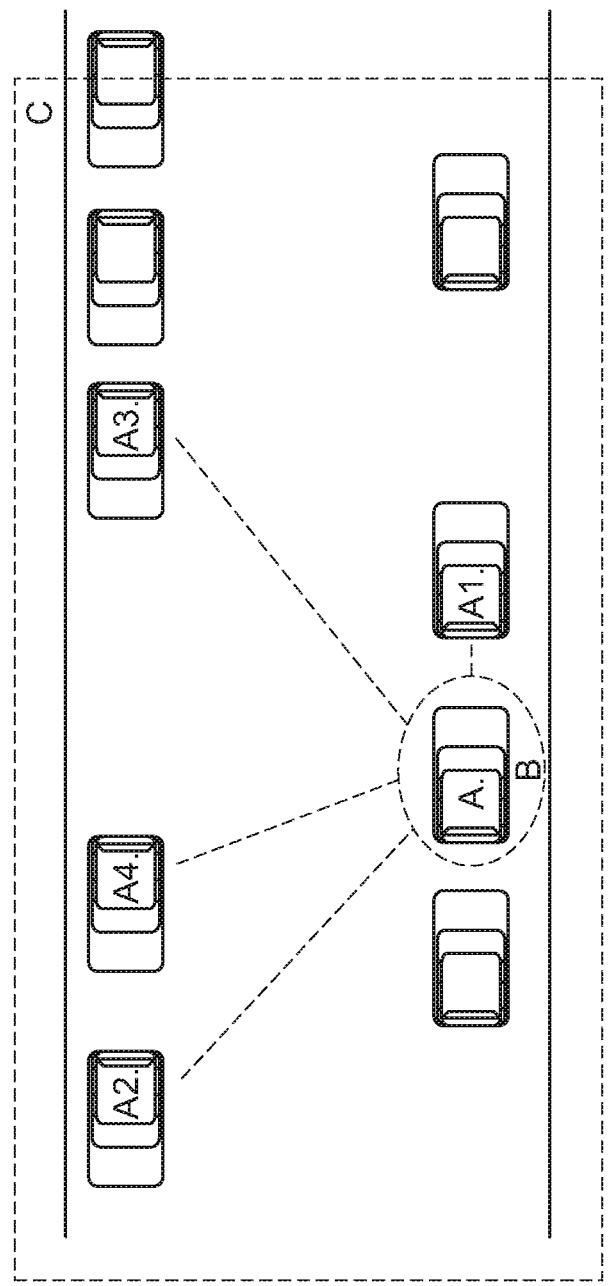

METHOD FOR PREVENTING THEFTS OF MOTOR VEHICLES

CROSS-REFERENCE TO RELATED APPLICATIONS

This application claims foreign priority benefits under 35 U.S.C. § 119(a)-(d) to DE Application 10 2016 209 679.6 filed Jun. 2, 2016, which is hereby incorporated by reference in its entirety.

TECHNICAL FIELD

The disclosure relates to a product for implementing a method for preventing thefts of motor vehicles.

BACKGROUND

Ever more refined methods are being employed in connection with thefts of motor vehicles. For example, a person monitors the wireless data communication between a driver of a motor vehicle and their motor vehicle while they unlock the motor vehicle, so that the person can clone the key or code. Another method is to replace electronic control units of a motor vehicle, such as an engine control unit of a motor vehicle, for instance. The motor vehicle can then be stolen with the aid of a special key. In order to prevent tracking, so-called GSM ("Global System for Mobile communication") scramblers have been used, in order to prevent position-fixing, for example by GPS ("Global Positioning System") data.

There is, therefore, a need to demonstrate ways that thefts of motor vehicles can be reliably prevented.

SUMMARY

The object of the disclosure is achieved by a method with the following steps:

detecting motor vehicles within a predetermined neighborhood of a motor vehicle to be monitored, sending a query data record from the motor vehicle to be monitored to the detected motor vehicles, and monitoring of the motor vehicle to be monitored by the detected motor vehicles on reception of the query data record.

The disclosure accordingly proposes that a motor vehicle to be monitored is monitored by other motor vehicles. For this purpose the motor vehicle to be monitored searches its neighborhood automatically for further parked motor vehicles, and takes advantage of the sensing technology of the other motor vehicles in order to prevent theft. Consequently, several motor vehicles that monitor each other reciprocally or mutually form a group. Hence, security measures that are directed against theft are transferred out of the respective motor vehicle to be monitored into other motor vehicles. Consequently, this anti-theft protection cannot be disabled, or outwitted, by manipulation in respect of the motor vehicle to be monitored.

According to one embodiment, the disclosure provides that the query data record includes: a code identifying the motor vehicle to be monitored, and/or data relating to the predetermined neighborhood and/or to a proximity zone of the motor vehicle to be monitored. The code identifying the motor vehicle to be monitored may be, for example, a random key, which is generated by the motor vehicle to be monitored and has been assigned to a particular piece of hardware such as, for example, the key of the motor vehicle, or a smartphone of the driver of the motor vehicle. After the motor vehicle has been parked by the driver of the motor vehicle, the motor vehicle to be monitored scans the predetermined neighborhood for likewise parked motor vehicles. The disclosure may provide that in the case of a plurality of detected motor vehicles a number of the detected motor vehicles are randomly selected. These randomly selected motor vehicles form a group. The data relating to the predetermined neighborhood permit the other motor vehicles to establish whether they belong to this group or not, for example, because their spacing from the motor vehicle to be monitored exceeds a predetermined distance.

According to a further embodiment, during the monitoring of the motor vehicle to be monitored, the code identifying the motor vehicle to be monitored is requested. Spacing values, position data, status data pertaining to the predetermined neighborhood and/or to the proximity zone of the motor vehicle to be monitored, and/or operating-state data pertaining to the motor vehicle to be monitored are requested and evaluated. The spacing values and/or position data may be measured values, captured with sensors of the motor vehicle to be monitored, that relate to spacing and/or positions of the detected motor vehicles. The status data pertaining to a neighborhood of the motor vehicle to be monitored may be definition data that define the neighborhood of the motor vehicle. For example, a zone with a spacing of 20 centimeters (cm) or more from the monitoring motor vehicle. The operating-state data pertaining to the motor vehicle to be monitored are sensor data that are captured with sensors of the detected motor vehicles. It may be a question, for example, of spacing data and/or position data pertaining to the motor vehicle to be monitored. Moreover, a random code relating to the key of the motor vehicle can be transmitted to the smartphone of the driver of the motor vehicle, in order to guarantee an identification of the driver of the motor vehicle in the event of a renewed start-up of the motor vehicle to be monitored.

According to a further embodiment, in response to detected irregularities, an alarm signal is generated and/or one of the detected motor vehicles sends a data packet to another of the detected motor vehicles for the purpose of verification. One of the detected motor vehicles sends a data packet to the motor vehicle to be monitored and/or a video recording is started. At regular time-intervals, a check is made as to whether irregularities are present, which point to an attempted theft. Irregularities of such a type may be, for example, detected persons in the detected neighborhood of the motor vehicle, such as in the proximity zone, a reception of incorrect codes, and/or changes of position and/or spacing. The alarm signal may be of visual nature, such as a flashing light for example, and/or of acoustic nature, such as a warning or siren tone for example, and/or an automatic notification of the police or a security service. The disclosure may provide that an alarm signal is generated if a predetermined evaluation threshold is exceeded by a result of evaluation of the detected irregularities. Consequently, random approaches of passers-by, for example, to the motor vehicle to be monitored do not trigger an alarm.

By sending a data packet from one of the detected motor vehicles to another, a verification of, for example, sensor data, position data and/or spacing data can be undertaken, in order to establish that it is not a question of errors of measurement, by defective sensors for example, if a comparison shows identical data. By the sending of a data packet to the motor vehicle to be monitored, further sensor data can be requested by the motor vehicle to be monitored in order to carry out a verification. With a start of a video recording, events in the neighborhood of the motor vehicle to be monitored can be documented, or live images can be transmitted directly to the police, or security services.

According to a further embodiment, in response to a detection of an unlocking of the motor vehicle to be monitored, a verification of the key of the driver of the motor vehicle is requested by one of the detected motor vehicles. If the comparison shows that the code assigned to the key of the driver of the motor vehicle is identical with the stored code, a release of the monitored motor vehicle takes place and the monitoring is concluded. If, on the other hand, the comparison shows that discrepancies are present, the comparison is appraised as an irregularity, and, where appropriate, further steps as described above are initiated for the purpose of verification.

A computer-program product for implementing a method of such a type and a motor vehicle of such a type further appertain to the disclosure.

The disclosure will now be elucidated on the basis of a drawing.

BRIEF DESCRIPTION OF THE DRAWINGS

The FIGURE in schematic representation, depicts a scenario for monitoring a motor vehicle according to an exemplary embodiment according to the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The FIGURE is not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Reference will be made to the FIGURE.

Represented is a road section with motor vehicles A1 to A4 parked on both sides of the road. Furthermore, a motor vehicle A has been parked and locked with the key of the motor vehicle by a driver of the motor vehicle.

In the present exemplary embodiment, motor vehicle A is the motor vehicle A to be monitored, whereas motor vehicles A1 to A4 perform the role of the monitoring motor vehicles A1 to A4, as will be elucidated in detail below.

To implement the method described below, the motor vehicle A to be monitored and the monitoring motor vehicles A1 to A4 may have hardware components and/or software components as well as suitable motor-vehicle sensors and communication devices for wireless transmission of data.

In response to the locking of motor vehicle A, during an activation procedure, motor vehicle A generates a random key that has been assigned to a key of the motor vehicle, or to a smartphone of the driver of the motor vehicle. Furthermore, with its sensors—such as, for example, cameras, capacitive sensors, radar sensors or ultrasound sensors— motor vehicle A scans its neighborhood C in the predetermined zone for parked motor vehicles, such as motor vehicles A1 to A4. The disclosure may provide for making a selection from a plurality of detected motor vehicles A1 to A4 by random function. In the present exemplary embodiment, the detected motor vehicles A1 to A4 were selected and form a group, whereas the other motor vehicles represented in the FIGURE were not selected. Moreover, motor vehicle A begins the monitoring of a proximity zone B, which in comparison with the neighborhood C has distinctly smaller dimensions, and extends, for example, into a zone with a range of 20 cm from motor vehicle A.

In an initialization step, motor vehicle A sends a query data record to the detected motor vehicles A1 to A4 by means of wireless transmission of data. The query record may contain the generated random key, and data that define the scanned neighborhood C and/or the proximity zone B, and the status thereof.

In response to the reception of the query data record, the detected motor vehicles A1 to A4 reply with wireless transmission of an acknowledgement data record to the motor vehicle A to be monitored. Furthermore, the detected motor vehicles A1 to A4 begin the monitoring of the motor vehicle A to be monitored. For this purpose, with their motor-vehicle sensors, which may be identical to the motor-vehicle sensors of the motor vehicle A to be monitored, they detect the position of the motor vehicle A to be monitored, and/or their spacing from the motor vehicle A to be monitored. Furthermore, they monitor the status of the proximity zone B. In addition, the disclosure may provide for transmitting the generated random key to the key of the motor vehicle, or to a smartphone of the driver of the motor vehicle for the purpose of identifying the driver of the motor vehicle prior to a renewed start-up.

In a following monitoring step, the random key, for example, of the motor vehicle A to be monitored is requested periodically within predetermined intervals by one or all the monitoring motor vehicles A1 to A4. Furthermore, the position data and spacing data relating to the motor vehicle A to be monitored are updated by a renewed measurement. In addition, the disclosure may provide for detecting the status of the proximity zone C by the vehicle sensors of the motor vehicle A to be monitored, and/or by the motor-vehicle sensors of the monitoring motor vehicles A1 to A4. Furthermore, status data pertaining to the motor vehicle A to be monitored can be queried, such as, for example, an operating state of the engine, a loading or locking state of a central locking system.

If irregularities—such as, for example, the expected transmission of the random key does not occur—are detected during the monitoring step, the disclosure may provide that a further query data record is sent from one of the monitoring motor vehicles A1 to A4 to the other monitoring motor vehicles A1 to A4. With the query data record, sensor data pertaining to the motor vehicles A1 to A4 being addressed may be requested. By comparison of the sensor data, the captured data can be verified. Alternatively, a further query data record can be sent from one of the monitoring motor vehicles A1 to A4 to the motor vehicle A to be monitored. In this way, further information such as sensor data, pertaining to the motor vehicle A to be monitored can be requested for the purpose of verification, or in response to reception of an alarm signal from the motor vehicle A to be monitored, warning measures are initiated, such as, for example, switching on the lighting of the motor vehicle, starting the engine, and generating a visual and/or acoustic warning signal. Finally, the disclosure may provide for starting a video recording by a camera of one of the monitoring motor vehicles A1 to A4.

If, on the other hand, the aforementioned verification procedures confirm the output data, and a predetermined threshold value for assessing a threat of theft is exceeded, upon reception of an alarm signal, all the motor vehicles— that is to say, the motor vehicle A to be monitored and the monitoring motor vehicles A1 to A4—can generate acoustic and/or visual alarm signals, and simultaneously notify the police and/or security services.

If the driver of the motor vehicle would like to unlock his/her motor vehicle again and put it into operation, the disclosure may provide that in response to a corresponding notification, the monitoring motor vehicles A1 to A4 request and verify the random key generated at the outset, and conclude the monitoring of the motor vehicle A to be monitored only in response to a positive verification.

Furthermore, the disclosure may provide that, in response to the detection, one of the monitoring motor vehicles A1 to A4 is put into operation. Putting one of the monitoring motor vehicle A1 to A4 is detected by the motor vehicle A to be monitored, for example with its sensing technology, and, thereupon, the motor vehicle A to be monitored scans the predetermined neighborhood C for motor vehicles that might be utilized for the purpose of monitoring. If one or more motor vehicles are detected, the motor vehicle A to be monitored sends a query data record to the newly detected motor vehicles.

Consequently, several motor vehicles that monitor each other reciprocally form a group, and the protection against theft has been improved.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle theft prevention method, comprising:
   detecting monitoring vehicles within a monitored vehicle predetermined neighborhood;
   sending a query record, defined by a monitored vehicle identification code and position and status data of the predetermined neighborhood and a monitored vehicle proximity zone, from a monitored vehicle to the monitoring vehicles;
   monitoring the monitored vehicle with the monitoring vehicles via the query record; and
   detecting irregularities by evaluating the code, spacing values, and monitored vehicle operating-state data.

2. The method as claimed in claim 1 further comprising, in response to detected irregularities, generating an alarm signal and sending a data packet from one of the monitoring vehicles to another of the monitoring vehicles to verify the detected irregularities.

3. The method as claimed in claim 1 further comprising, in response to detected irregularities, starting a video recording and sending data packet from one of the monitoring vehicles to another of the monitoring vehicles to verify the detected irregularities.

4. The method as claimed in claim 1 further comprising requesting, via one of the monitoring vehicles, a verification of a key of a driver to unlock the monitored vehicle.

5. A vehicle anti-theft system comprising:
   a control unit configured to,
      in response to an acknowledgment from a plurality of vehicles of a query data record defined by an identifying code and position and status data indicative of a predetermined neighborhood and a proximity zone, operate proximity sensors disposed on the plurality of vehicles to detect position and spacing data of the plurality of vehicles in the predetermined neighborhood,
      in response to an evaluation of the code, spacing values, position and status data, and operating state data, detect irregularities in the code,
      in response to the irregularities, spacing value, position and status data, and vehicle operating state data, generate an alarm signal and send a data packet from one of the plurality of vehicles to another of the plurality of vehicle to verify the irregularities,
      in response to a verification of the irregularities, record a video and send a data packet front one of the plurality of vehicles to another of the plurality of vehicles, and
      in response to an unlock command via a key request, request a key verification from one of the plurality of vehicles.

6. The anti-theft system as claimed in claim 5, wherein the control unit is further configured to, in response to the irregularities, start a video recording and send a data packet from one of the plurality of vehicles to another of the plurality of vehicles.

7. The anti-theft system as claimed in claim 5, wherein the control unit is further configured to, in response to an unlock command via a key, request a verification of the key from one of the plurality of vehicles.

8. A vehicle comprising:
   a plurality of sensors that detect a plurality of vehicles within a predetermined neighborhood; and
   a control unit configured to,
      in response to an acknowledgment from the plurality of vehicles of a query data record, defined by an identifying code and position and status data of a predetermined neighborhood and a proximity zone of a vehicle within the plurality of vehicles, operate sensors to detect position and spacing data of the plurality of vehicles in the predetermined neighborhood,
      in response to an evaluation of the code, spacing values, position and status data and operating state data of the vehicle, detect irregularities in the code,
      in response to the irregularities, spacing value, position and status data and operating state data, generate an alarm signal and send a data packet from the vehicle to another of the plurality of vehicles to verify the irregularities,
      in response to the irregularities, record a video and send a data packet front the vehicle to another of the plurality of vehicles, and
      in response to an unlock command via a key request, request a key verification of the key from another of the plurality of vehicles.

* * * * *